US012135802B2

(12) United States Patent
Sangamala

(10) Patent No.: US 12,135,802 B2
(45) Date of Patent: Nov. 5, 2024

(54) TOKEN FREQUENCY BASED DATA MATCHING

(71) Applicant: Palo Alto Networks, Inc., Santa Clara, CA (US)

(72) Inventor: Venkata Ashok Kumar Sangamala, Dublin, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 426 days.

(21) Appl. No.: 17/448,267

(22) Filed: Sep. 21, 2021

(65) Prior Publication Data

US 2023/0034741 A1  Feb. 2, 2023

Related U.S. Application Data

(60) Provisional application No. 63/203,683, filed on Jul. 28, 2021.

(51) Int. Cl.
*G06F 21/60* (2013.01)
*G06F 16/22* (2019.01)
(Continued)

(52) U.S. Cl.
CPC ........ *G06F 21/604* (2013.01); *G06F 16/2255* (2019.01); *G06F 16/2458* (2019.01); *G06F 16/29* (2019.01); *H04L 9/0643* (2013.01)

(58) Field of Classification Search
CPC .................................................. G06F 21/604
(Continued)

(56) References Cited

U.S. PATENT DOCUMENTS 8,606,771 B2 * 12/2013 Arasu ................ G06F 16/2272
707/706
9,971,809 B1 * 5/2018 Tarsi .................... G06F 16/2455
(Continued)

OTHER PUBLICATIONS

Botelho, et al., "A New Algorithm for Constructing Minimal Perfect Hash Functions", ResearchGate, Federal university of Minas Gerais, Department of Computer Science, retrieved on Jun. 7, 2021 from https://www.researchgate.net/publication/228715398_A_new_algorithm_for_constructing_minimal_perfect_hash_functions, Jan. 2008, 13 pages.

(Continued)

*Primary Examiner* — Dant B Shaifer Harriman
(74) *Attorney, Agent, or Firm* — Gilliam IP PLLC

(57) ABSTRACT

To protect a dataset with low overhead, a cybersecurity appliance uses multiple structures to facilitate efficient matching ("matching infrastructure") when applying data leakage prevention rules. The cybersecurity appliance creates the matching infrastructure in advance from scanning the dataset to be protected. The cybersecurity appliance creates the matching infrastructure with differentiation among tokens occurring in the dataset at different frequencies: unique, infrequent or rare, and frequent. The differentiation of tokens into different classes of frequency of occurrence within the dataset allows efficient matching with a bias towards the less frequently occurring tokens which are more likely the tokens that are sensitive while still allowing efficient matching of frequent tokens that form a restricted data pattern of a DLP rule.

20 Claims, 7 Drawing Sheets

(51) Int. Cl.
*G06F 16/2458* (2019.01)
*G06F 16/29* (2019.01)
*H04L 9/06* (2006.01)

(58) Field of Classification Search
USPC .......................................................... 726/26
See application file for complete search history.

(56) References Cited

U.S. PATENT DOCUMENTS

| 10,572,511 | B2* | 2/2020 | Anderson | G06F 16/3338 |
|---|---|---|---|---|
| 10,970,414 | B1* | 4/2021 | Lesner | G06F 21/602 |
| 11,004,548 | B1* | 5/2021 | Austin | H04L 9/3226 |
| 2012/0197928 | A1* | 8/2012 | Zhang | G06F 16/2471 |
| | | | | 707/769 |
| 2013/0124524 | A1* | 5/2013 | Anderson | G06F 16/3338 |
| | | | | 707/737 |
| 2019/0081787 | A1* | 3/2019 | Bayar | G06F 21/6218 |
| 2019/0155925 | A1* | 5/2019 | Giannikis | H03M 7/00 |
| 2022/0198055 | A1* | 6/2022 | Deshmukh | G06F 16/137 |

OTHER PUBLICATIONS

Botelho, et al., "An Approach for Minimal Perfect Hash Functions for Very Large Databases", Semantic Scholar, Corpus ID: 2067754, retrieved on Jun. 7, 2021 from https://www.semanticscholar.org/paper/An-Approach-for-Minimal-Perfect-Hash-Functions-for-Botelho/beb83dc40f11c1586a1e423b0600480a28e5d8ba, 2006, 8 pages.
Genuzio, et al., "Fast Scalable Contruction of (Mininal Perfect Hash) Functions", International Symposium of Experimental Algorithms, Lecture Notes in Computer Science, vol. 9685. Springer, Cham. retrieved on Aug. 9, 2021 from https://doi.org/10.1007/978-3-319-38851-9_23, Mar. 2016, 12 pages.
EP Application No. 22187057.9, Extended European Search Report mailed Dec. 1, 2022, 9 pages.

* cited by examiner

TOKEN FREQUENCY BASED DATA MATCHING

BACKGROUND

The disclosure generally relates to data processing and information security.

Data loss prevention refers to a system's ability to identify, monitor, and protect data in use, data in motion, and data at rest. The ability to monitor and protect data in motion can also be referred to as data leakage prevention. Data leakage prevention can employ exact data matching to enforce a security policy that includes a rule or provision for data leakage prevention. As indicated in the name, a system enforces a data leakage prevention rule with exact data matching by determining whether data in motion includes data exactly matching an entry in a protected dataset.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to minimal perfect hashing in illustrative examples. Aspects of this disclosure are not necessarily limited to minimal perfect hashing and can use perfect hashing, for example. In other instances, well-known instruction instances, protocols, structures and techniques have not been shown in detail in order not to obfuscate the description.

Overview

The overhead of exact data matching for data leakage prevention can consume large amounts of memory and compute time. While the memory overhead may be a concern, the compute time overhead can impact performance and introduce latency to data-in-motion. With the data matching technology disclosed herein, a dataset can be protected with data leakage prevention without imposing notable overhead on the data in motion.

To protect a dataset with low overhead, a cybersecurity appliance uses multiple structures to facilitate efficient matching ("matching infrastructure") when applying data leakage prevention rules. The cybersecurity appliance creates the matching infrastructure in advance from scanning the dataset to be protected. The cybersecurity appliance creates the matching infrastructure with differentiation among tokens occurring in the dataset at different frequencies: unique, infrequent or rare, and frequent. The distinction between infrequent tokens and frequent tokens is a configurable criterion. Additional infrastructure can be created for multiple term (multi-term) tokens occurring in the dataset. The differentiation of tokens into different classes of frequency of occurrence within the dataset allows efficient matching with a bias towards the less frequently occurring tokens which are more likely the tokens that are sensitive while still allowing efficient matching of frequent tokens that form a restricted data pattern of a DLP rule. The matching infrastructure that differentiates tokens into frequency classes allows exact data matching to occur in nearly linear time with low false positives.

Example Illustrations

Figure 1:
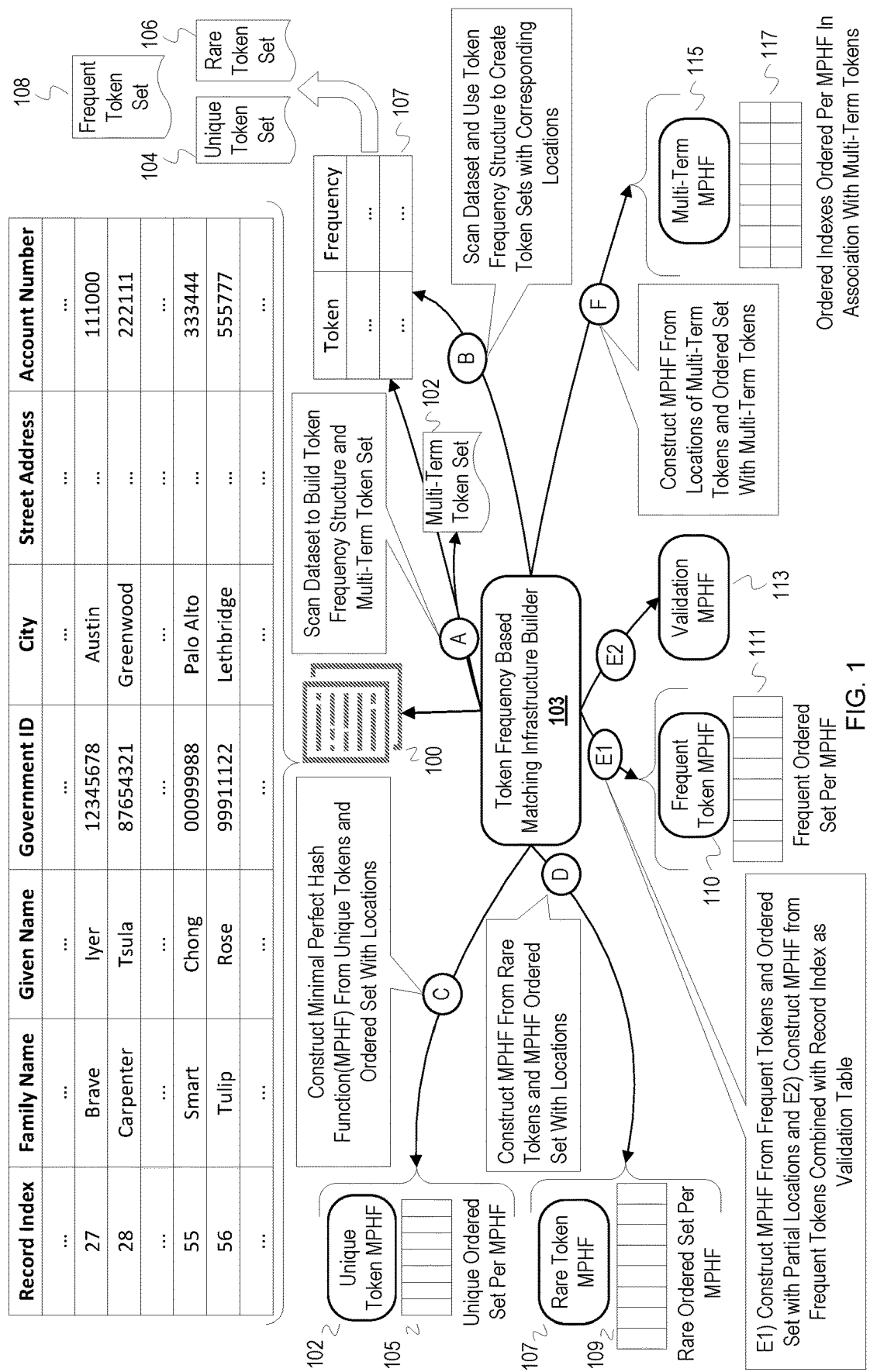
FIG. 1 is a schematic diagram of a token frequency based matching infrastructure builder building matching infrastructure based on frequency of token occurrence in a dataset.

FIG. 1 is a schematic diagram of a token frequency based matching infrastructure builder building matching infrastructure based on frequency of token occurrence in a dataset. While the example illustration uses clear values for the tokens to aid in understanding, more likely the tokens of the dataset are obfuscated values (e.g., encrypted). Implementations likely provide an interface to securely submit the dataset to be protected. When the submitting, the submitter provides some information to an interface about the dataset (e.g., delimiters, encoding, whether a header row is included), and the dataset is encrypted based on this information to preserve the basic organization of data while encrypting the individual datum (e.g., each datum is hashed). The backend will host encrypted values with dataset organization preserved. With the interface, the submitter creates a non-informative configuration file to aid in later creating data leakage rules. Additionally, the submitter can provide helpful information ("hints") to optimize scanning of the dataset (e.g., identifying which columns have multi-term tokens only).

FIG. 1 depicts a token frequency based matching infrastructure builder 103 ("builder") constructing a matching infrastructure that includes structures 104, 105, 106, 108, 109, 111, and 117. The builder 103 also constructs several minimal perfect hashing functions (MPHFs) 102, 107, 110, 113, 115 as part of the matching infrastructure. The builder 103 constructs the matching infrastructure from a dataset 100 as illustrated with stage annotations A-F. The letters represent stages of operations, with stages E1 and E2 instead of stage E. Each stage of operations can be one or more operations depending upon implementation. The stages of operations may overlap.

At stage A, the builder 103 scans the dataset 100 to build a token frequency structure and multi-term token set. Before scanning the dataset 100, the builder 103 instantiates a token frequency structure 107 to track frequency of occurrence of tokens within the dataset 100. The builder 103 updates the token frequency structure 107 to either indicate a token and initial count (i.e., 1) when first encountered or to increment frequency for a token already encountered. If the builder 103 encounters a multi-term token when scanning, the builder updates a multi-term token set 102 with the multi-term token and location indices of the multi-term token. If a metadata file was created for the dataset 100 indicating columns with multi-term tokens, the builder 103 can use the metadata to optimize building the multi-term token set 102, for example deferring scanning of columns with only multi-term tokens.

At stage B, the builder 103 scans the dataset 100 again and uses the token frequency structure 107 to create frequency class sets—unique token set 104, rare token set 106, and frequent token set 108. The builder 103 queries the token frequency structure 107 with a token encountered while scanning the dataset 100. The token frequency structure 107 returns the frequency for the queried token. The builder 103 then writes the token and location of the token into the appropriate set based on the returned frequency if not yet written into one of the frequency class sets 104, 106, 108. If the token has already been recorded into the rare token set 106 or the frequency token set 108, then the builder 103 updates the entry with the location information.

After creation of the token frequency class sets 104, 106, 108, the builder 103 uses the token frequency class sets to create the minimal perfect hash function MPHF based parts of the matching infrastructure. This is illustrated in stages C-F.

At stage C, the builder 103 constructs the MPHF and ordered set for the unique tokens. Different libraries are available for constructing a MPHF which is a perfect hash function (hash function mapping each different key to a distinct table entry or distinct integer that indexes to a table entry and has no collisions) with minimal number entries/integers (i.e., same number of entries/integers as keys). Example libraries implementing MPHF include the emphf library; the C minimal perfect hashing library (CMPH); the compress, hash, and displace (CHD) MPHF library, and the Bloom-filter based BBHash MPHF library. Construction of the MPHF for the unique tokens, the unique token MPHF 102, uses the unique tokens listed in the unique token set 104 as input to the MPH implementation. After construction of the unique token MPHF 102, the builder 103 constructs unique tokens ordered set 105 (e.g., file or array) according to the positions of the tokens as determined by the unique token MPHF 102. For example, the unique token MPHF 102 may have determined the positions of the hashes of the tokens "123245678," 87654321," and "99911122" to be {2, 0, 1} in which case the builder 103 creates the ordered set 105 as {87654321, 99911122, 123245678}. The unique ordered set 105 is used to verify an MPHF match with the token input into MPHF since collisions can occur at positions determined from the MPHF. While this example described the builder 103 writing entire tokens into the ordered set, implementations may write a portion (e.g., the 8 most significant bytes). In addition, the builder 103 creates the unique tokens ordered set 105 with location indexes associated with the corresponding ones of the unique tokens or hashes of unique tokens. The set of structures for a frequency class are also referred to herein as coupled structures of a frequency class or token frequency class coupled structures.

At stage D, the builder 103 constructs a MPHF and ordered set for rare/infrequent tokens. Rare tokens are those tokens that are not unique within a dataset but have a frequency within the dataset that is below a threshold defined to separate infrequent and frequent tokens. The threshold can vary based on number of data fields, type of data within a dataset, size of a dataset, or a combination of dataset characteristics. The threshold can also be defined based on size boundaries or memory footprint constraints of an infrequent token map and structures for the frequent tokens with respect to lookup times. Construction of the MPHF for the infrequent tokens, rare token MPHF 107, uses the rare tokens listed in the rare token set 106 as input into the MPH implementation. After construction of the rare token MPHF 107, the builder 103 constructs a rare tokens ordered set 109 according to the positions of the rare tokens as determined by the rare token MPHF 107 with the locations associated therewith. In contrast to the unique tokens in the unique tokens ordered set 105, each rare token in the rare tokens ordered set 109 will have multiple locations in the dataset 100 which will be indicated in the set 109.

At stages E1 and E2, the builder 103 constructs the frequent token matching infrastructure differently than the unique and rare token matching infrastructure. The difference arises to preserve efficiency while handling the large number of frequent tokens (i.e., those with a frequency greater than the threshold separating frequent and infrequent). At stage E1, the builder 103 constructs a MPHF for frequent tokens, frequent token MPHF 110 and a frequent token ordered set 111. Construction of the frequent token MPHF 110 uses the frequent tokens listed in the frequent token set 108 as input to the MPH implementation. The builder 103 stores partial location information (e.g., data field indexes without record indicators) of a frequent token in association with the frequent tokens indicated in the frequent tokens ordered set 111. For example, the builder 103 stores the partial location information for a frequent token in a hash bucket referenced by the frequent token entry in the ordered set 111. As with infrequent tokens, frequent tokens will occur more than once within the dataset 100 and can occur at a significantly greater frequency than infrequent tokens. To manage the memory and computing overhead for frequent tokens, record indicators are used to form keys as input into a MPH implementation to create a frequent tokens validation MPHF 113 instead of including the record indicators in the frequent tokens ordered set 111. At stage E2, the builder 103 constructs the validation MPHF 113 with combinations of the frequent tokens and indicators of records in which the frequent tokens occur. The key set includes each combination of record indicator and frequent token (e.g., concatenated together). The builder 103 does not create an ordered set based on the validation MPHF 113. The existence of an entry in the validation MPHF 113 is treated as validation that a token exists at the indicated record. This combination of data structures 110, 111, 113 allows for representation of frequent tokens in searchable structures with a smaller memory footprint and less search time.

At stage F, the map builder 103 constructs a MPHF 115 for multi-term tokens and builds an ordered set 117. Since matching multi-term tokens to data-in-motion can become challenging, the builder 103 creates this separate structure for multi-term tokens in the dataset 100 regardless of frequency. For the multi-term tokens, the MPHF 115 is constructed with the locations of multi-term tokens as the key set based on reading the multi-term token set 102. The builder 103 then creates an ordered set of the multi-term token locations positioned according to the multi-term token MPHF 115. The builder 103 creates the ordered indexes set 117 with each location associated with the corresponding multi-term token.

Figure 2:
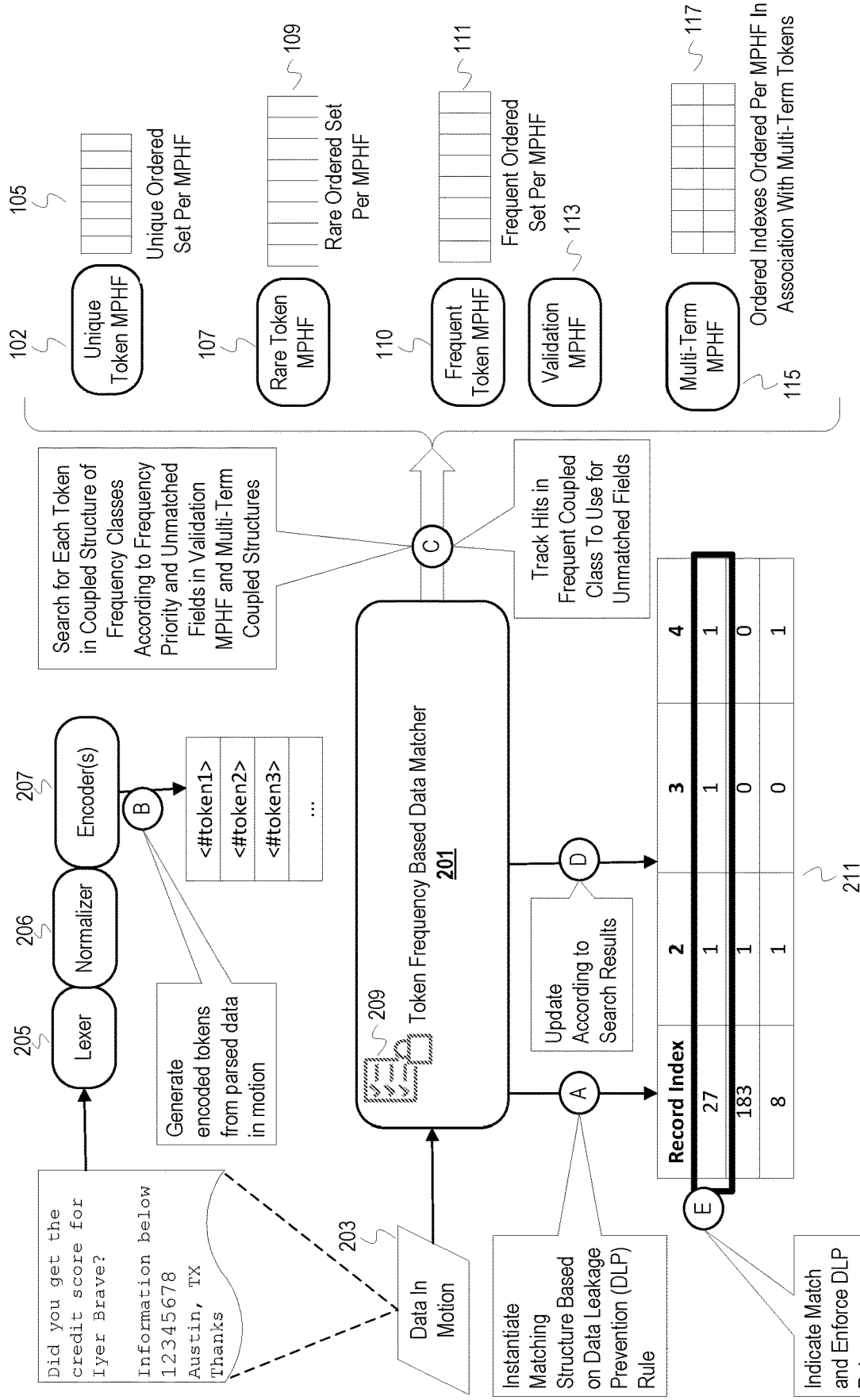
FIG. 2 is a schematic diagram of a data matcher using frequency based matching infrastructure to protect a dataset according to a security policy that indicates a data leakage prevention rule.

FIG. 2 is a schematic diagram of a data matcher using frequency based matching infrastructure to protect a dataset according to a security policy that indicates a data leakage prevention rule. The description for FIG. 2 will refer back to some of the example content depicted in FIG. 1 to facilitate understanding. FIG. 2 depicts a token frequency based data matcher 201, a lexer 205, a normalizer 206, and an encoder 207 (e.g., implemented with a function call into a library file). FIG. 2 depicts the frequency based data matcher 201 applying a data leakage prevention (DLP) rule to a data in motion object 203 (e.g., e-mail message) with stages of operations A-D. As with FIG. 1, each of the stages of operations can be one or multiple operations. The lexer 205, normalizer 206, and the encoder 207 can be part of the token frequency based data matcher 201 or implemented separately and invoked by the token frequency based data matcher 201.

At stage A, the token frequency based data matcher 201 instantiates a matching structure 211 based on detection of the data in motion object 203 and a DLP rule 209. The token frequency based data matcher 201 is implemented in a cybersecurity appliance (e.g., a firewall) with visibility of data in motion with respect to a network or organization. Embodiments can instead implement a data matcher separately from a cybersecurity appliance but in communication with a cybersecurity appliance to analyze data in motion detected by the cybersecurity appliance (e.g., implemented in a software as a service model). The token frequency based data matcher 201 ("data matcher") determines a combination of data fields indicated in the DLP rule 209 and creates the matching structure for tracking which data fields indicated in the DLP rule are observed in data in motion. In this illustration, the matching structure 211 includes fields to indicate a record index and data fields 2, 3, 4. Referring to FIG. 1, the data fields 2, 3, and 4 correspond to the data fields "Given Name," "Government ID," and "City." Thus, the DLP rule 209 indicates that data in motion with tokens matching tokens within dataset 100 at the specified data fields for a record requires a security action (e.g., blocking the data in motion, tracking the data in motion, etc.).

At stage B, the lexer 205, normalizer 206, and the encoder 207 operate serially to generate hash values of tokens extracted and normalized from the data-in-motion object 203. The lexer 205 parses the data-in-motion object 203 to yield tokens (e.g., according to specified delimiters, tokens to ignore, etc.). This parsing information for the lexer can be indicated in a configuration file or the metadata that accompanies the dataset 100 when submitted for protection. Similarly, the normalizer 206 normalizes (e.g., normalizes punctuation, spacing, capitalization, etc.) according to same or similar rules used to normalize the dataset (e.g., indicated in a metadata of the dataset). The encoder(s) 207 generates hash values of the tokens generated from the lexer 205. The encoder(s) 207 implements the same encoding that was used to obfuscate and/or secure the dataset prior to transmission for protection against data leakage prevention. The encoder(s) 207 may be multiple encoders stacked or in sequence that obfuscated tokens in a dataset and then encrypted the obfuscated tokens.

At stage C, the data matcher 201 searches the matching infrastructure for each of the tokens derived from the data-in-motion object 203. The data matcher 201 searches the matching infrastructure in priority from least frequent to most frequent. Each set of coupled token frequency structures can be considered as corresponding to a frequency class separated by thresholds defining the classes from least to most frequent. The data matcher 201 first searches the unique token MPHF 102 for each token, then searches the rare token MPHF 107 for each token not yet found, and then searches the frequent token MPHF 110 for each token not yet found. Finally, the data matcher 201 uses the results of the previous searching to determine whether any of the multi-term tokens indicated in the multi-term token MPHF 115 are detected in the data-in-motion object 203. While performing the search, the data matcher 201 updates the matching structure 211 at stage D. The operations of stages C and D will overlap.

Using the dataset 100 from FIG. 1 to illustrate, the data matcher 201 searches the tokens generated from the data-in-motion object 203 for a combination of tokens that occur in data fields 2, 3, and 4 for any single record within the dataset 100. As described previously, construction of the MPHFs were likely done with a library that instantiates a query function for searching the MPHFs. A call to the query function passes a token to search as an argument and the query function will generate a hash value of the token with the MPHF that was constructed for that set of keys and returns a position mapped to the token hash value by the MPHF. When the data matcher 201 queries the unique token MPHF 102 with the token for "12345678" from the data-in-motion 203, the unique token MPHF 102 returns a position of the token. The data matcher 201 then accesses the indicated position in the unique ordered set 105 to confirm the match and obtain the associated dataset location. As a reminder, implementations will more likely be looking for matching ciphertext instead of cleartext. In addition, an implementation may only store in the ordered sets partial bytes of tokens in which case the data matcher 201 would truncate the encoded token corresponding to "12345678" from the data-in-motion 203 to verify the match. For this token, the data matcher 203 retrieves the corresponding location/indexing information (3, 27) which indicates that the token "12345678" can be found in the dataset 100 in data field 3 of record 27. The data matcher 201 updates the matching structure 211 to populate an entry with an indication of record index 27 and a match indicator (e.g., bit flag). This indicates that a match was found for the indicated token from the data-in-motion 203 and the match can be found within the dataset in data field 3 of record 27.

After searching the unique token MPHF 105, the data matcher 201 queries the rare token MPHF 107 for each of the tokens generated from the data-in-motion object 203 not found in the unique token MPHF 102. Assuming a hit in the rare token MPHF 107, the data matcher 201 accesses the position indicated by the rare token MPHF 107 in the rare ordered set 109 to confirm that the encoded token, for 'Iyer' as an example, matches the encoded token at the accessed position. If there is a match, the data matcher 201 updates the matching structure 211 to indicate that a match of a hash of "Iyer" was found in the data-in-motion object 203. Based on the example dataset 100, the accessed entry in the rare token ordered set 109 for the hash value of "Iyer" will indicate 3 locations: (2, 27), (2, 183), and (4, 8). If a data field not indicated in the DLP rule 209 is returned, the matching structure 211 does not represent that data field and the corresponding indexing information is disregarded. The data matcher 201 updates the entry already created for record 27 to indicate that a matching token was found for the token occurring in data field 2 of record 27. The data matcher 201 also creates or populates an entry of the matching structure 211 to indicate record 183 and data field 2 and an entry to indicate record 8 and data field 4 since Iyer occurs at those locations (not depicted in FIG. 1) in the dataset 100. If the rare token ordered set 109 indicates location information with a data field not being tracked in the matching structure 211, then that data field is not indicated in the DLP rule 209 and is irrelevant to data matching.

After searching the rare token ordered set 109, the data matcher 201 searches the frequent token MPHF map 110 for the tokens of the data-in-motion object 203 not yet found. Using the token "Austin" to illustrate, the frequent token MPHF 110 returns a position that the data matcher 201 uses to access the frequent ordered set 111. The location information associated with the hash of "Austin" in the frequent token ordered set 111 is limited to data field indexes and does not include record indicators because of the frequency of the frequent tokens. Assuming associated locations are data field indexes (2,4), this indicates that the token occurs in the data fields 2 and 4—"Given Name" and "City." Both of these data fields are relevant for data matching as indicated by the matching structure 211. At the point of searching the frequent token coupled structures 110, 111, however, the data matcher 201 is constraining the searching to records indicated in the matching structure 211. In addition, data fields with frequent tokens are less significant than the unique and rare tokens. Therefore, the data matcher 201 tracks matched frequent tokens in a temporary structure and later validates those matches if data fields remain unfilled or unmatched in the matching structure 211. When attempting to fill unmatched data fields, the data matcher 201 uses the frequent token validation MPHF 113 to determine whether the returned data field indexes of tokens matched against the coupled frequent token structures 110, 111 are valid for the record indicators represented in the matching structure 211. Since data field indexes 2 and 4 were returned, the data matcher 201 searches the validation MPHF 113 for combinations of each record indicated in the matching structure 211 and the token corresponding to the returned data field indexes. Since the validation MPHF 113 was built with a MPHF, the validation MPHF 113 is constrained to returning positions only for the key set used to construct the MPHF 113. Therefore, a query to the validation MPHF 113 for a record indicator and token combination that is not in the validation MPFH 113 will yield an out of bound result. In this example, the data matcher 201 obtains validation that the token "Austin" occurs at records 27 and 8. Since the token "Austin" occurs in data fields 2 and 4 and in records 27 and 8, the corresponding entries in the matching structure are updated accordingly. The data matcher 201 marks both data field 4 in the entry for record 27 as having a match. The result from searching the coupled frequent token structures 110, 111 also included indication of data field 2, but data field 2 has already been marked for record 27. In contrast, the entry for record 8 indicates a match found for data field 4 but not for data field 2. The data matcher 201 updates the entry for record 8 in the matching structure 211 to indicate a match found for the token in data field 2 of record 8. While a false positive could be generated when using only markers/bit flags, implementations can store the encoded tokens in the matching structure for subsequent verification of a matching record against a dataset.

After searching the structures for the frequent token class, the data matcher 201 searches the multi-term token map 115 based on data fields represented in the matching structure 211 that have yet to be found. At this point in the illustration, records 27, 183, and 8 are indicated in the matching structure 211. All data fields for record 27 have been marked as found. Data field 3 has not been matched for records 183 and 8. The data matcher 201 will search the multi-term token MPHF 115 for combinations of "183" and "3," and "8" and "3." If a combination hits in the multi-term map 115, then multi-term tokens occur at that corresponding location. The multi-term token MPHF 115 returns a position of hashed matching location information (e.g., a hash of a concatenation of string "183_3" that the data matcher 201 then uses to access the ordered indexes set 117. From the accessed entry in the ordered indexed set 117, the data matcher obtains the multi-term token at that location. The data matcher 201 then determines whether the multi-term token at that location in the dataset 100 has a match in the data-in-motion object 203. The data matcher 201 will iterate through the tokens produced from the data-in-motion object 203 searching for a match with the first term that forms the multi-term token obtained from the ordered indexes set 117. If a match is found, then the data matcher 201 determines whether an adjacent token matches the second term in the token sequence that forms the multi-term token obtained from the ordered indexes set 117.

At stage E, the data matcher 201 indicates that a match has been found that violates the DLP rule 209. The data matcher 201 indicates that the data-in-motion object 203 includes tokens corresponding to restricted data fields of a record in the dataset 100. To enforce the DLP rule 209, a cyber appliance that hosts the data matcher 201 or in communication with the data matcher 201 can redact the violating tokens from the data-in-motion object 203, generate a warning or notification, flag the data-in-motion object 203, and/or trigger/perform another security action to enforce the DLP rule 209.

The examples are described with reference to a data matcher and a matching infrastructure builder for efficient identification of program code with a particular purpose. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

While FIGS. 1-2 present schematic diagrams with particular content to initially illustrate token frequency based data matching, FIGS. 3, 4A-4C and 5 are flowcharts that present token frequency based data matching with example operations approximating program flow. The description for FIG. 1-2 referred to the various structures of the matching infrastructure. The coupled structures of each class can collectively be considered maps since the use of the coupled structures, with the exception of the multi-term token class, obtains a dataset location(s) or partial dataset location(s) for a given token. Accordingly, the descriptions for the flowcharts will refer to maps and mapping structures at least partly to address the shortcoming and variability of language when describing technology.

Figure 3:
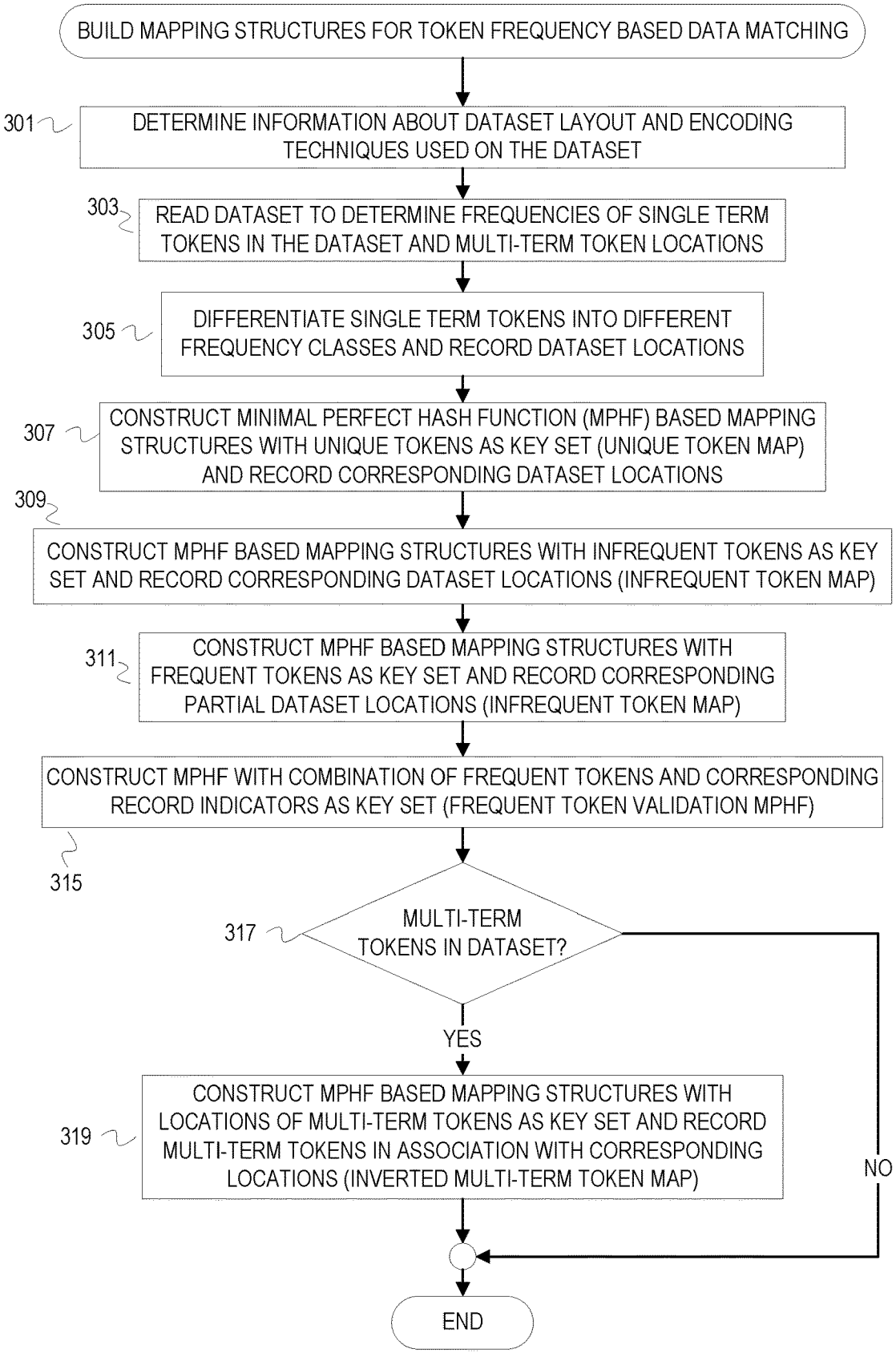
FIG. 3 is a flowchart of example operations for building mapping structures for token frequency based data matching.

FIG. 3 is a flowchart of example operations for building mapping structures for token frequency based data matching. These example operations refer to the MPHF because the MPHF allows the token frequencies to be used in minimizing size of the mapping structures. FIG. 3 presents these example building operations with an assumption that multi-term data fields are not always present in a dataset. In addition, FIG. 3 refers to a map builder as performing the operations for consistency with referral to the coupled structures collectively as a map.

At block 301, a map builder determines information about a dataset that at least includes dataset layout and encoding techniques used on the dataset. The dataset layout information includes number of data fields, number of records, and indications of data fields that have only multi-term tokens (e.g., mailing address), a mixture of multi-term tokens (e.g., family name), and either explicit or implicit indication of the data fields that only have single term tokens. Information about the encoding techniques is stored to obtain implementing program code to encode data evaluated against a DLP rule that protects the dataset. The information can also include parsing/lexer rules to be applied on data-in-motion for consistency with the parsing performed on the source dataset.

At block 303, the map builder reads a dataset to determine token frequencies of single term tokens within the dataset and locations of multi-term tokens and corresponding locations. For the token frequencies, the map builder records tokens when first encountered within the dataset and then updates count for subsequent occurrences. For multi-term tokens, the map builder records a multi-term token and dataset location when first encountered and adds additional locations for subsequent occurrences of an already observed multi-term token. The dataset can be associated with "hints" (i.e., metadata) that indicates which data fields have multi-term tokens. These hints can also identify data fields that have only multi-term tokens and those that have a mixture of multi-term tokens and single term tokens. The map builder can maintain the single term tokens and token frequencies in a structure separate from a structured used to list multi-term tokens and locations. The hints can be used to read the data fields with only multi-term tokens last, for example.

At block 305, the map builder differentiates the single term tokens into different frequency classes and records dataset locations. The different frequency classes include unique tokens, rare/infrequent tokens, and frequent tokens. The infrequent token class includes those tokens that satisfy the rare/infrequent token criterion. The infrequent token criterion is defined with a configurable value (M) and the infrequent token criterion can be defined as 1>TOKEN_FREQUENCY<=M. The frequent token class includes those tokens that satisfy the frequent token criterion (i.e., those single term tokens that are neither unique nor rare/infrequent). In this illustration, the frequent token criterion is defined as TOKEN_FREQUENCY<M. Differentiating the tokens of the different frequency classes includes creating lists or sets of the tokens for each class. For instance, the map builder traverses the counting structure that was created from determining token frequencies and adds an encountered token into a frequency class set based on the indicated frequency The map builder also records location information into the frequency class sets. Either as the tokens are added to sets or after the tokens have been differentiated into their appropriate frequency class set, the map builder reads the dataset to determine dataset locations.

At block 307, the map builder constructs MPHF based mapping structures with the unique tokens as a key set and records corresponding dataset locations. The map builder creates the MPHF with the unique token key set and then creates a container set or set of the unique tokens ordered by the positions determined by the MPHF with the dataset locations associated therewith. Instead of the entire token, embodiments can store a portion of the token as previously stated to reduce memory footprint. Embodiments can truncate tokens to reduce memory footprint for all classes or for less than all classes, for example only for the frequent tokens.

At block 309, the map builder constructs MPHF based mapping structures with the infrequent tokens as a key set and records corresponding dataset locations. The map builder creates the MPHF with the rare tokens as the key set and then creates a set of the rare tokens ordered by the positions determined by the MPHF with the dataset locations associated therewith. Each of the rare tokens will be associated with multiple dataset locations within the bounds of the rare frequency class.

At block 311, the map builder constructs MPHF based mapping structures with the frequent tokens as a key set and records partial dataset locations. Since a frequent token may occur multiple times in a same data field across records, a frequent token may map to a single data field index. However, the frequent token mapping structures are built to accommodate the more likely case of multiple data field indexes mapping to a frequent token. Recording of only partial dataset locations (e.g., data field indexes and no record indicator) is done to reduce memory consumption and since frequent tokens are less sensitive tokens individually.

At block 315, the map builder constructs a MPHF with combinations of frequent tokens and corresponding record indicators as a key set. Without a record indication, data matching could not occur. However, having complete location information for frequent tokens can severely impact computational efficiency. If a frequent token has an occurrence frequency of 2500 in a dataset, then an entry for that token in the frequent token map would involve maintaining a list of 2500 locations and traversing that 2500 element list to determine a match. Instead, the frequent token map eschews record indicators to limit location information to data field indexes and uses a separate structure to validate matches in the frequent token mapping structures. Since use of the constructed MPHF ("frequent token match validation MPHF") is limited to validating matches in the frequent token mapping structures, the map builder does not create an ordered set. A hit in the frequent token match validation MPHF indicates that the frequent token that formed part of the source for the MPHF key occurs at the record indicator that forms the other part of the source for the MPHF key.

At block 317, the map builder determines whether there are any multi-term token data fields in the dataset. This can be determined from hints associated with the dataset or while scanning the dataset. If the dataset lacks metadata indicating data fields with multi-term tokens, then the lexical analysis while scanning can detect multi-term tokens and indicate them in a tracking structure. If there are no multi-term tokens in the dataset, then the process ends. If there are multi-terms tokens in the dataset, operational flow continues to block 319.

At block 319, the map builder constructs MPHF based mapping structures with locations of multi-term tokens as a key set and records the corresponding multi-term tokens in association with the locations ordered per the MPHF. Instead of mapping tokens to dataset locations as the other mapping structures, the multi-term MPHF based structures map dataset locations to the corresponding multi-term token occurring at the location. Thus, the map is referred to as the "inverted multi-term token map." The locations can be combinations of indexes represented as a string formed from the indexes and a delimiter character between each index. The locations are used as the key set instead of the multi-term tokens for efficiency and because the inverted multi-term token map is used to fill in unmatched data fields when applying a DLP rule.

Figure 4:
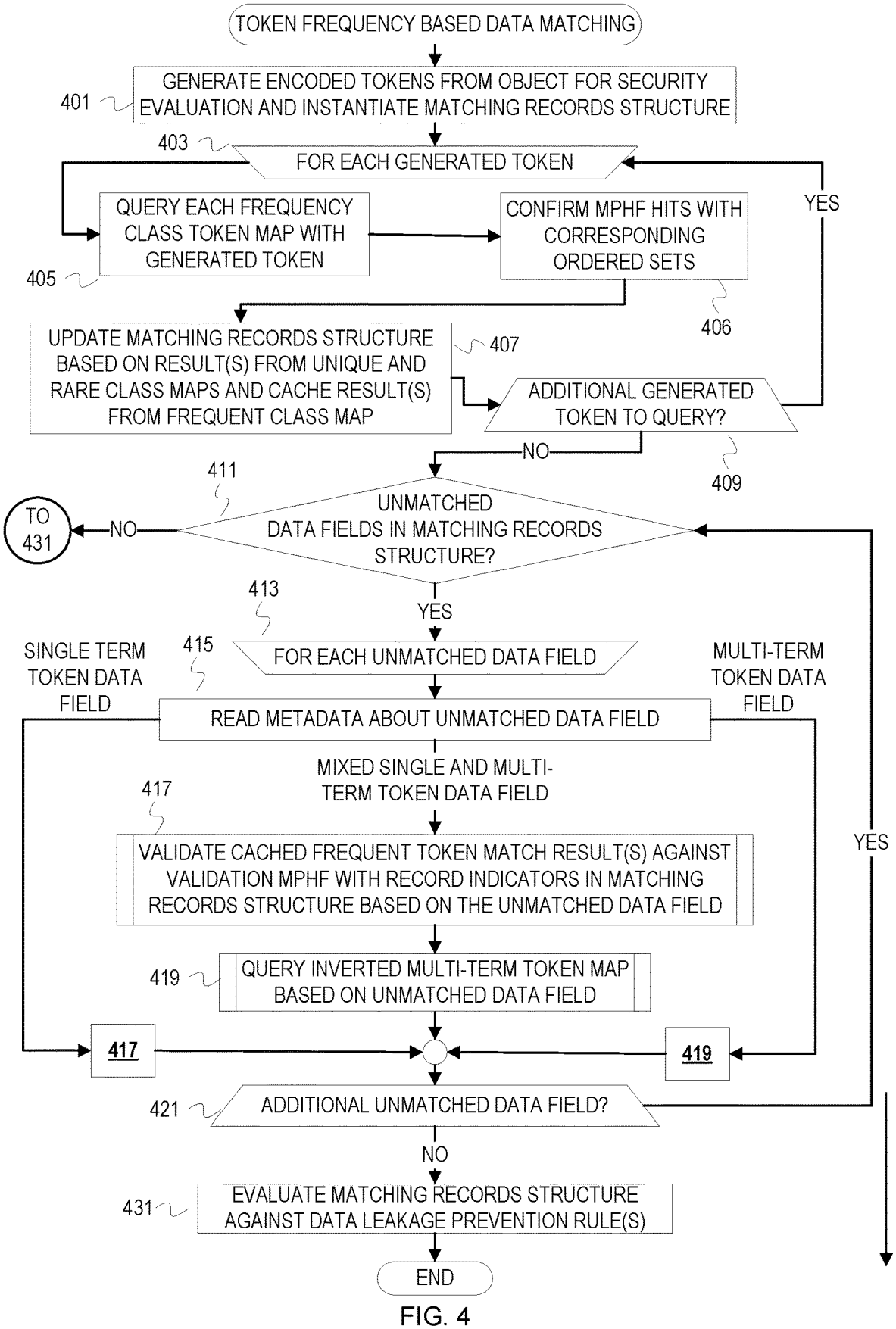
FIG. 4 is a flowchart of example operations for token frequency based data matching.

FIG. 4 is a flowchart of example operations for token frequency based data matching. The description refers to a data matcher as performing the example operations for consistency with earlier figures. For the token frequency based data matching, the matching infrastructure for a corresponding dataset has already been created.

At block 401, a data matcher generates encoded tokens from a data-in-motion object for security evaluation and instantiates a matching records structure. The data matcher detects or obtains the data-in-motion for evaluation. The data matcher invokes a lexer, normalizer, and encoder to parse the object into tokens and then encode the tokens with an encoding technique that was applied to the dataset being protected (e.g., SHA-256). Embodiments can perform additional pre-processing of the data-in-motion such as cleaning. The data matcher instantiates the matching records structure based on a data field pattern defined in a DLP rule. The data matcher will instantiate a matching records structure that accommodates storing of matched tokens of the data fields specified in the data field pattern or flags depending on implementation.

At block 403, the data matcher begins iterating over each generated token to search for the generated tokens in the frequency based matching infrastructure.

At block 405, the data matcher queries each frequency class token map with the generated. As an example, the data matcher invokes the query functions of the unique, rare, and frequent MPHFs with the generated token as an argument. Each query function will generate a hash value of the generated token according to a hash function defined for the corresponding MPHF.

At block 406, the data matcher confirms hits in the MPHFs with the corresponding ordered sets. The queries on the MPHFs will return positions from hits in the MPHFs (i.e., that the MPHF computed hash of the input token maps to a key set position previously determined by the MPHF). If no position is returned or an out of bound indicator is returned, then the MPHF hash of the generated token misses for that MPHF. With the position(s) that is returned, the data matcher accesses the corresponding ordered set. For example, the data matcher would access the entry in the unique ordered set corresponding to the third position if the unique MPHF returns 3 (assuming the first position is not indicated by 0). The data matcher accesses an entry in the ordered set to confirm the MPHF based match and obtain location information for updating the matched records structure. The accessed entry will host either the token input into the MPHF or a truncated version of the input token. This hit confirmation is performed to address false positives from MPHF hash collisions.

At block 407, the data matcher updates the matching records structure based on results of the queries to the frequency class token maps and caches (i.e., stores in a temporary data structure) results of confirmed frequent token matches. For a confirmed match of a generated token against the unique token map, the data matcher will update the matching records structure to indicate the generated token and dataset location for that token. For a confirmed match of a generated token against the rare token map, the data matcher will update the matching records structure to indicate the generated token and the dataset location(s) relevant to the DLP data pattern. For a confirmed match of a generated token against the frequent token map, the data matcher will update temporary tracking structure for frequent token matches. The data matcher does not update the matching records structure yet because the frequent token ordered set only indicates partial location information to constrain size of the frequent token class structures. Accordingly, the cached, matched frequent tokens will be later used to fill incomplete patterns in the matching records structure.

At block 409, the data matcher determines whether there is an additional generated token from the data-in-motion object to search for in the frequency class token maps. If there is an additional generated token to search, then operational flow continues to block 403 for the next generated token. Otherwise, operational flow continues to block 411.

At block 411, the data matcher examines the matching records structure to determine whether there is an unmatched data field (i.e., incomplete data patterns) for indicated record. In some cases, the DLP rule will be defined with data field indexes that only host unique tokens or rare and unique tokens. Even if a DLP rule includes data field indexes with frequent tokens in the data pattern, the partial data patterns with record indicators are determined from data field indexes with either or both of unique or rare tokens. If there is not an unmatched data field in any of the entries of the matching records structure, then operational flow continues to block 431. Otherwise, operational flow continues to block 413 for the data matcher to attempt to fill the incomplete data patterns in the matching records structure.

At block 413, the data matcher begins iterating over the unmatched data fields of the matching records structure across indicated records. Implementations can instead iterative over indicated records across unmatched data fields.

At block 415, the data matcher reads metadata about the unmatched data field of the current iteration. The metadata will indicate whether the unmatched data field hosts only single term tokens, only multi-term tokens, or hosts both types of tokens. The type of hosted token determines which token map to query. If the unmatched data field has a mixture of single term and multi-term tokens in the dataset, then the data matcher will search query the frequent token validation MPHF and the multi-term token map (417 and 419). If the unmatched data field only has single term tokens, then operational flow continues to block 417 where the data matcher only queries the frequent token validation MPHF. If the unmatched data field only has multi-term tokens, then operational flow continues to block 419 where the data matcher only queries the multi-term token map.

At block 417, the data matcher validates the cached, frequent token map match results against the frequent token validation MPHF with record indicators in the matching records structure based on the unmatched data field. Example operations for implementing this validation are provided in FIG. 5.

Figure 5:
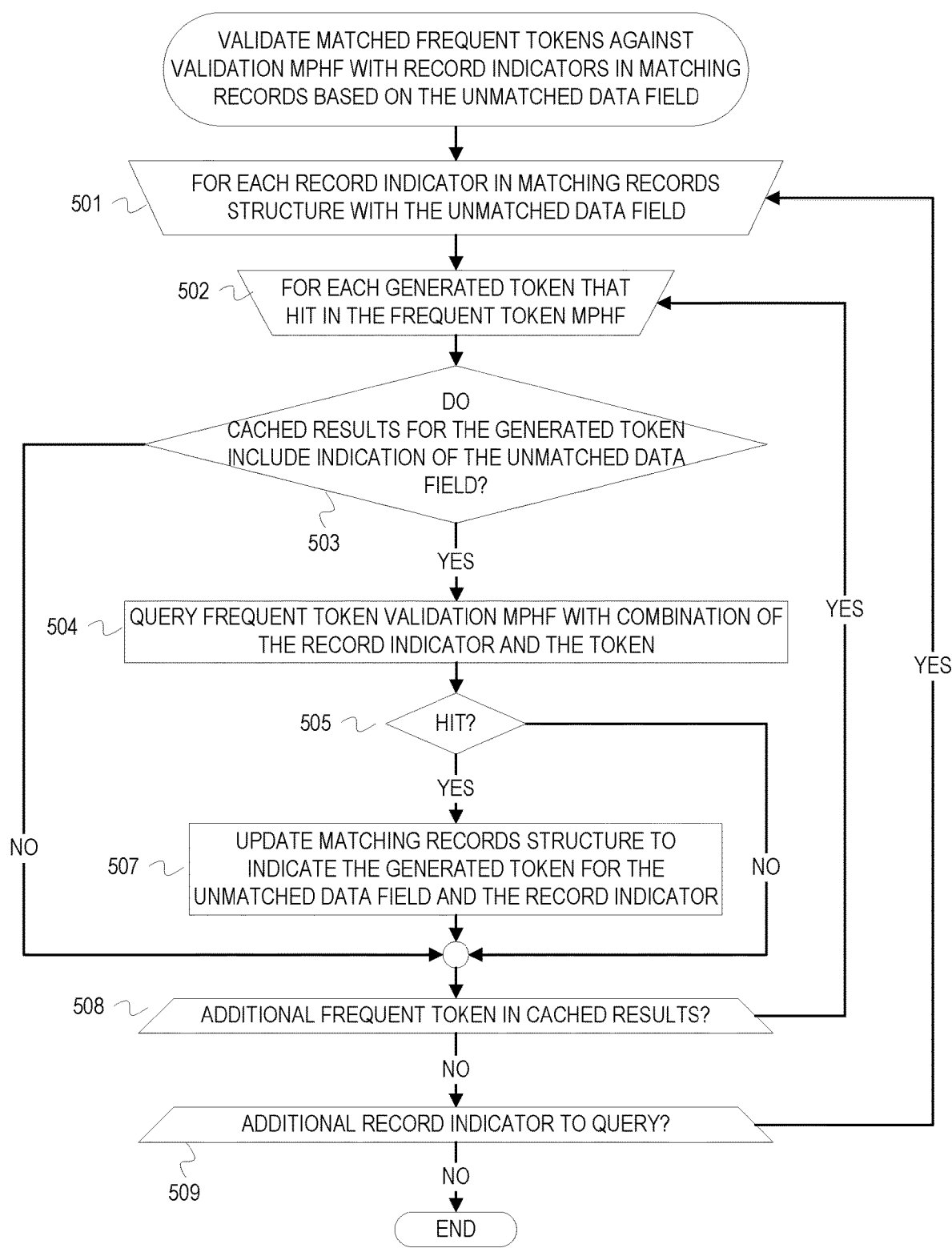
FIG. 5 is a flowchart of example operations for validating matched frequent tokens with the frequent token validation MPHF.

FIG. 5 is a flowchart of example operations for validating matched frequent tokens with the frequent token validation MPHF. The frequent token validation MPHF, as previously described, is constructed at dataset intake with aggregation of frequent tokens and corresponding record indicators as the key set. Accessing the validation MPHF with an input token formed from a generated token that hit in the frequent token MPHF and from a record indicator from the matching records structure indicates the existence of the generated token at a data field index for the indicated record.

At block 501, the data matcher begins iterating through the record indicators in the matching records structure. At block 502, the data matcher iterates through each generated token that hit in the frequent token MPFH as indicated in the cached results. Implementation can instead nest the looping through indicated records with unmatched data fields within looping through the frequent token matches in the cached results.

At block 503, the data matcher determines whether the cached result for the generated token of the current iteration include indication of the unmatched data field. Since the frequent token ordered set stores partial dataset locations in association with frequent tokens, the cached results will include in association with a matched frequent token the dataset data field indexes corresponding to the frequent token. If the cached results for the generated token of the current iteration do not include indication of the unmatched data field, then operational flow continues to block 508. Otherwise, operational flow continues to block 504 since the matched frequent token may occur at the record indicated by the record indicator.

At block 504, the data matcher queries the frequent token validation MPHF with a combination of the record indicator and the token. For example, the data matcher creates an input token for the query with a string form of the generated token that hit in the frequent token MPHF concatenated with a string form of the record indicator. If the MPHF hash of the input token maps to an entry, then the query function will return a position. Otherwise, the frequent token validation MPHF will return an out of bound result.

At block 505, the data matcher determines whether input token hits in the frequent token validation MPHH (i.e., whether a valid position is returned). If the result is an out of bound type of result, then operational flow continues to block 508. Otherwise, operational flow continues to block 507.

At block 507, the data matcher updates the matching records structure to indicate the frequent token matched for the indicated record and the indicated unmatched data field. For instance, the data matcher writes the generated token that has been validated with the frequent token validation MPHF into the matched records structure at an entry or cell corresponding to the record indicator of the current iteration and the data field index of the unmatched data field.

At block 508, the data matcher determines whether there is another generated token in the cached results from the frequent token map queries. If there is, then operational flow continues to block 502 to evaluate the next generated token in the frequent token mapping cached results. If the cached results have been traversed, the operation flow continues to block 509.

At block 509, the data matcher determines whether there is an additional record indicator in the matching records structure to query on the validation MPHF for the potentially matched frequent token. If there is an additional record indicator, then operational flow returns to block 439. Otherwise, operational flow for validation ends, which then continues to block 501 If each of the record entries in the matching records structure lacking a data match for the unmatched data field has been evaluated, then operational flow ends. Overall operational flow may continue to block 419 or 421 depending upon the metadata of the unmatched data field.

Returning to FIG. 4, the data matcher queries an inverted multi-term token map based on the unmatched data field. Example operations for querying the inverted multi-term map are provided in FIG. 6.

Figure 6:
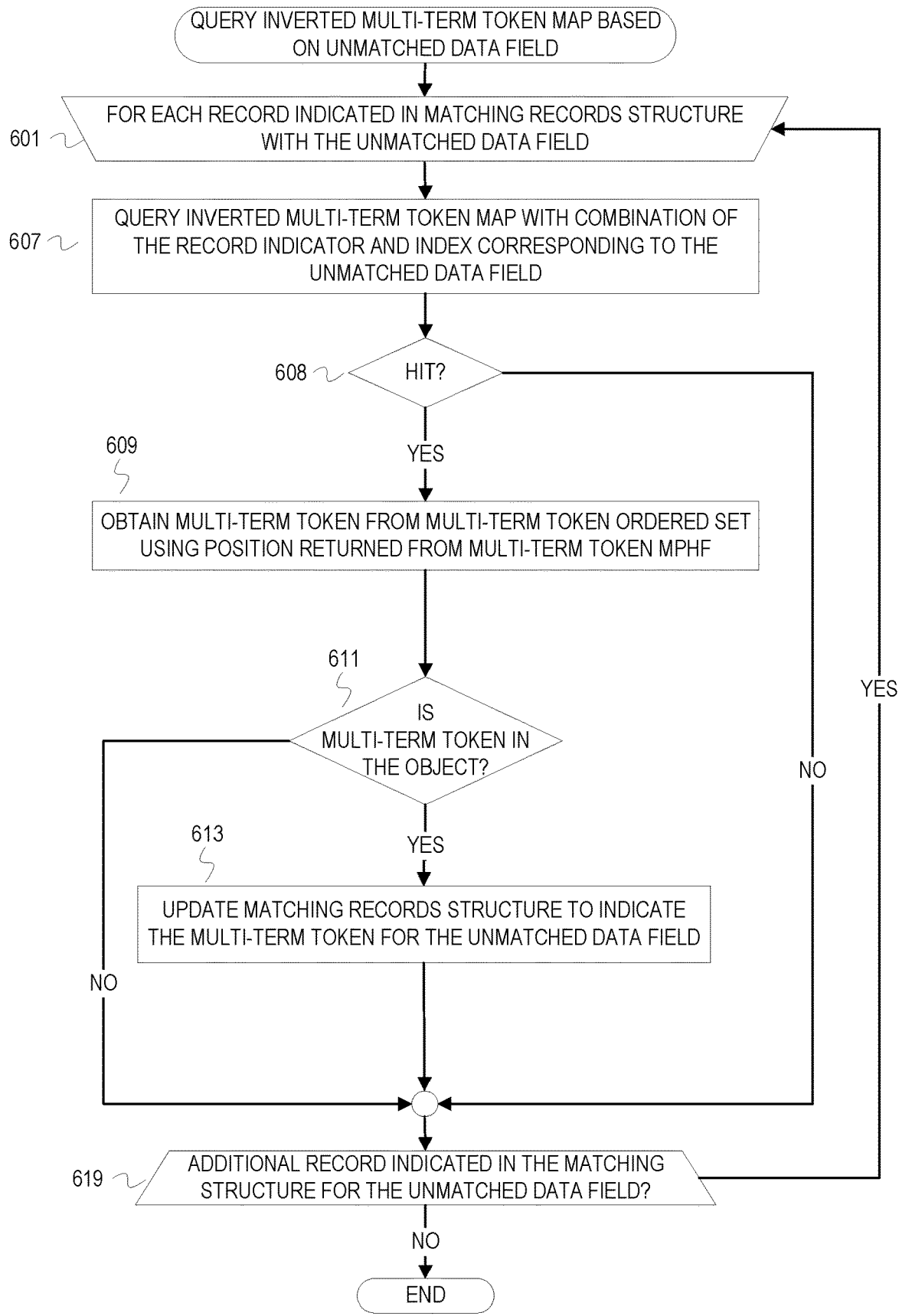
FIG. 6 is a flowchart of example operations for querying an inverted multi-term token map based on an unmatched data field.

FIG. 6 is a flowchart of example operations for querying an inverted multi-term token map based on an unmatched data field. If a dataset does not include any multi-term tokens, then the multi-term MPHF structures will not have been created and these operations will not be performed.

At block 501, the data matcher begins iterating through each record indicator indicated in the matching records structure. If a record entry in the matched records structure has multiple unmatched data fields, then data matcher will eventually iterate through each of the unmatched data fields for the record.

At block 607, the data matcher queries the inverted multi-term token map with a combination of the record indicator of the current iteration within the loop starting at block 601 and the index of the unmatched data field of the current iteration within the loop starting at block 413. For example, the data matcher queries the multi-term token map with an input token formed from a string concatenation of the record indicator and the unmatched data field index.

At block 608, the data matcher determines whether the query returns a valid position (i.e., whether the input token hit in the multi-term token MPHF). As with the other MPHF structures, a miss returns an out of bound indication or empty result. If a valid position is returned, then operational flow continues to block 609. If not, then operational flow continues to block 619 for processing of the next indicated record, if any.

At block 609, the data matcher obtains a multi-term token from the multi-term token ordered set based on the position returned from querying the multi-term token MPHF. The multi-term token ordered set includes the constituent parts of the token input to the MPHF associated with a corresponding multi-term token. The data matcher validates the hit by confirming that the dataset location matches in case of a MPHF hash collision and then retrieves the associated multi-term token. To reduce the chances of a collision in the hash computed by the MPHF, the builder may have included an additional part when forming the key. For instance, the builder may have concatenated a string of the total number of dataset records with the dataset indexes to form the keys. To illustrate, the builder may have created a key "500000000_31_2" for record indicator/index 31 and data field index 2.

At block 611, the data matcher determines whether the obtained multi-term token occurs within the data-in-motion object. Searching the tokens generated from the data-in-motion object can vary depending upon implementation. As an example, the data matcher selects one of the terms from the obtained multi-term token and searches through the tokens generated from the data-in-motion object for a match. If a match is found, then the data matcher searches adjacent tokens for matches with a corresponding other term of the multi-term token. Using clear text as examples, the data matcher searches the data-in-motion object tokens for "Cowee" assuming the multi-term token is "Cowee Stecoah Steecoy." If no match is found, then the multi-term token does not occur in the data-in-motion object. If a match is found, then the data matcher determines whether the data-in-motion object token subsequent to "Cowee" matches "Stecoah," and then determines whether "Steecoy" follows if "Stecoah" matched. If the data matcher determines that the multi-term token is not in the data-in-motion object, then operational flow continues to block 619. If the data matcher determines that the multi-term token is in the data-in-motion object, then operational flow continues to block 613.

At block 613, the data matcher updates the matching records structure to indicate the multi-term token for the unmatched data field of the current iteration in the entry corresponding to the record indicator of the current iteration.

At block 619, the data matcher determines whether there is an additional matching records entry to evaluate for unmatched data field. If not, then operational flow ends for FIG. 6 and continues to block 421 of FIG. 4.

Returning to FIG. 4, the data matcher determines whether there is another unmatched data field in the matching records structure at block 421. If there is another unmatched data field, then operational flow returns to block 411. If there are no other unmatched data fields, then the matched records structure has been processed and operational flow continues to block 431.

At block 431, the data matcher evaluates the matching records structure against the data leakage prevention rule(s) defined for the dataset. If any entry in the matching records structure has a complete data field pattern defined by a DLP rule, then the rule is violated. The data matcher can indicate the violation for a security action to be taken and/or can verify the match of the data field pattern against the data set. For each record indicated in the matching records structure with a complete DLP data field pattern, the data matcher can verify that the tokens in the matching records structure entry match the token in the record.

Variations

In addition to the validations described above to address possible collisions in hash values, embodiments can perform additional validations. To illustrate, collisions can arise from the truncation of tokens. Despite the validation done with the truncated tokens to avoid false positives from the MPHF hashing, different source tokens may still collide because of the truncation. To further reduce false positives, a "proximity check" can be applied to the entries before applying a DLP rule. The proximity check defines a proximity, for example 100 characters, of relevance for tokens. If an entry in the matching records structure includes tokens outside of this proximity, then the entry is disregarded. The proximity is defined with a range x based on an assumption that tokens in a matching entry outside of the proximity within a data-in-motion object are not relevant to each other. Using a document with several pages as an example and a proximity of 100 characters, the proximity check presumes that a group of tokens in a matching entry that are distributed across the pages outside of the defined proximity are not relevant to each other in forming a data pattern of interest as defined by a DLP rule.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. Embodiments may not consider frequent tokens and multi-term tokens. Embodiments may search for matching data field patterns with unique and infrequent/rare tokens. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

An environment may allow a customer to provide a dataset via an interface, such as a command line interface. To protect the dataset, the interface would be associated with a tool that encrypts the dataset prior to transmission to a backend. To preserve the structural information (e.g., type of data in columns), the customer or data owner will create a configuration file that maps the dimensions (e.g., columns) to data types. This can be used to aid in defining the security policies. In addition, a metadata file can be created with information ("hints") about the dataset. Examples of hints include which dimensions only have single terms, only have multiple-term tokens, which have a mixture of multi-term and single term tokens.

While the described embodiments determine location information after establishing token frequency, embodiments may record location information as tokens are encountered. In some cases, memory is more available than processing resources for multiple file reads.

While the described embodiments refer to building maps for each frequency class of token, embodiments can build container sets. A "container set" refers to a container (e.g., file) that contains a set of elements (in this case encrypted tokens) with explicit or implicit ordering according to the MPHF mapping. To illustrate, the unique (encrypted) tokens are input into the utilized MPHF technique/library-defined functions for the MPHF to map the encrypted tokens to unique positions for the set. The container set is then created with the encrypted tokens ordered as determined by the MPHF.

To address this, a "proximity check" can be performed. A proximity check can limit candidate matches to those in which the matching tokens are within a specified distance of each other within the target data object (e.g., e-mail message).

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
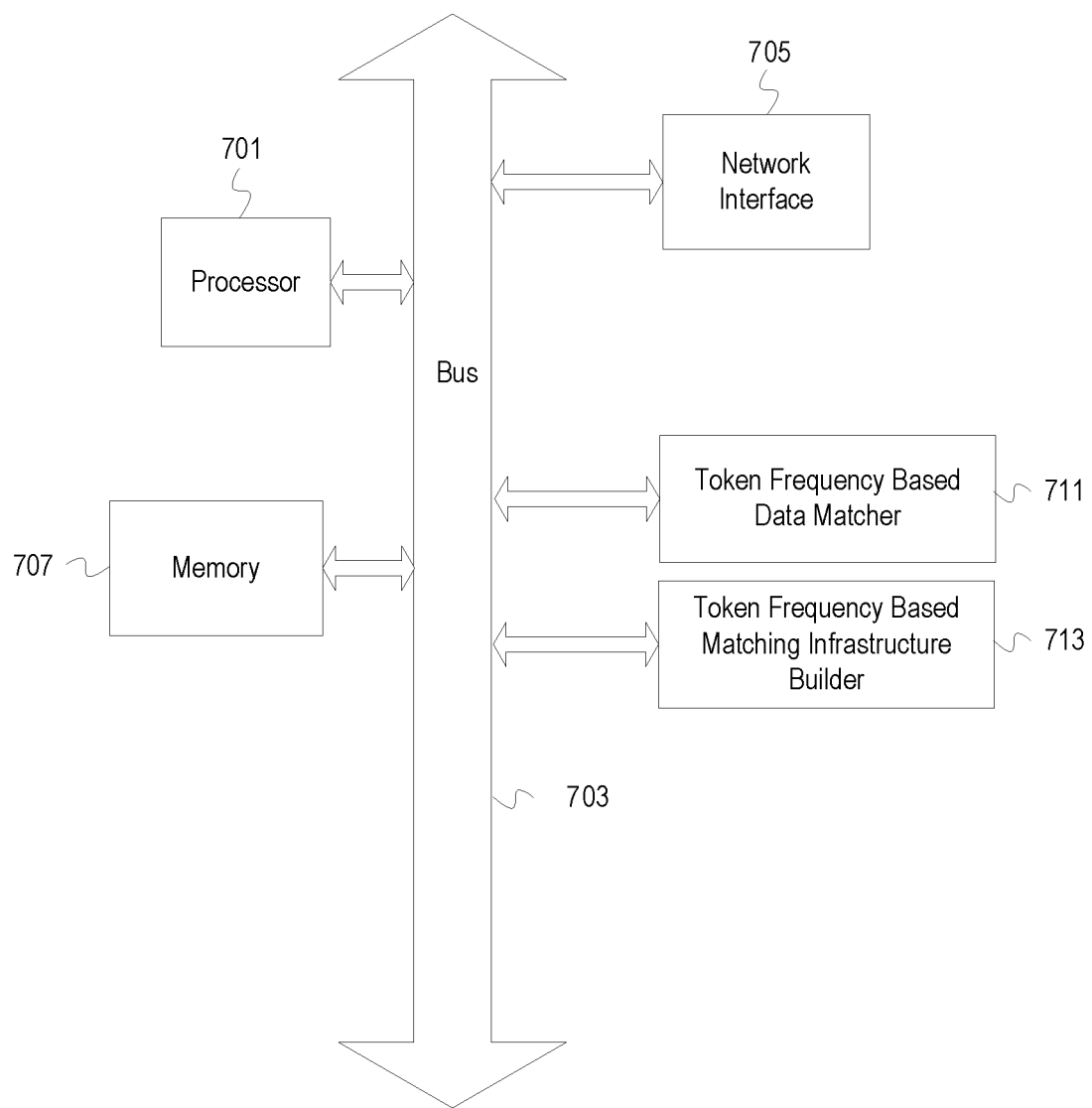
FIG. 7 depicts an example computer system with a token frequency data matcher and a token frequency based matching infrastructure builder.

FIG. 7 depicts an example computer system with a token frequency data matcher and a token frequency based matching infrastructure builder. The computer system includes a processor 701 (possibly including multiple processors, multiple cores, multiple nodes, and/or implementing multithreading, etc.). The computer system includes memory 707. The memory 707 may be system memory or any one or more of the above already described possible realizations of machine-readable media. The computer system also includes a bus 703 and a network interface 705. The system also includes a token frequency based matching infrastructure builder 713 and a token frequency based data matcher 711. The token frequency based matching infrastructure builder 713 scans a dataset to determine frequencies of tokens within the dataset and locations of the tokens. The token frequency based matching infrastructure builder 713 can also determine multi-term tokens and locations thereof from the dataset profiling. With the token counts, the token frequency based matching infrastructure builder 713 differentiates the tokens by token frequency and then builds MPHF based structures per frequency class that map tokens to dataset locations or partial dataset locations for each frequency class. With these structures, the token frequency based data matcher 711 can apply a DLP rule to a data-in-motion to protect a dataset. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
generating a first set of one or more tokens from a data-in-motion object; and
based at least partly on the first set of tokens, determining whether the data-in-motion object violates a data leakage prevention rule for a dataset, wherein determining whether the data-in-motion object violates the data leakage prevention rule for the dataset comprises,
querying each of a plurality of minimal perfect hashing functions with each of the first set of tokens, wherein each of the plurality of minimal perfect hashing functions corresponds to a different class of token frequency within the dataset, wherein a first of the plurality of minimal perfect hashing functions was created from a key set of unique tokens within the dataset and a second of the plurality of minimal perfect hashing functions was created from a key set of tokens that occur infrequently within the dataset according to a defined frequency criterion;
determining one or more data field indexes and one or more record indicators of the dataset for those of the first set of tokens that hit in at least one of the first and second minimal perfect hashing functions; and
determining whether the data field indexes complete a data field pattern specified by the data leakage prevention rule for at least one record of the dataset indicated by one of the record indicators.

2. The method of claim 1 further comprising:
instantiating a tracking data structure according to the data field pattern specified by the data leakage prevention rule to track matches of tokens of the first set of tokens to tokens of the dataset; and
updating the tracking data structure based, at least in part, on results of the querying and determination of the data field indexes,
wherein determining whether the data field indexes complete the data field pattern is based, at least in part, on the tracking data structure.

3. The method of claim 1, wherein a third of the plurality of minimal perfect hashing functions was created from a key set of frequent tokens that are neither unique nor infrequent.

4. The method of claim 3 further comprising:
determining one or more data field indexes of the dataset for those of the first set of tokens that hit in the third minimal perfect hashing function;
tracking those of the first set of tokens that match tokens of the dataset based, at least in part, on hits in the third minimal perfect hashing function; and
based on a determination that results from querying the first and second minimal perfect hashing functions do not complete the data field pattern for at least one record of the dataset, determining whether those of the first set of tokens that match tokens of the dataset based, at least in part, on hits in the third minimal perfect hashing function can complete the data field pattern for at least one of the records.

5. The method of claim 4, wherein determining whether those of the first set of tokens that match tokens of the dataset based, at least in part, on hits in the third minimal perfect hashing function can complete the data field pattern for at least one of the records comprises:
for each record indicator with a partially complete data field pattern based on results of querying the first and second minimal perfect hashing functions,
selecting each of those of the first set of tokens that match tokens of the dataset based, at least in part, on hits in the third minimal perfect hashing function and that correspond to a data field index that would complete the partially complete data field pattern; and
verifying that the selected token occurs for a record indicated by the record indicator.

6. The method of claim 5, wherein verifying that the selected token occurs for a record indicated by the record indicator comprises querying a fourth of the plurality of minimal perfect hashing functions with a combination of the selected token and the record indicator and determining whether a result of the querying is a hit.

7. The method of claim 1 further comprising:
based on a determination that results from querying the first and second minimal perfect hashing functions do not complete the data field pattern for at least one record of the dataset and a determination that the dataset includes multiple term tokens,
querying a third of the plurality of minimal perfect hashing functions with a combination of a record indicator and a data field of the data field pattern not yet matched, wherein the third minimal perfect hashing function was created from a key set of record indicators combined with data field indexes for each multiple term token of the dataset; and
for each multiple term token obtained based on querying the third minimal perfect hashing function, searching the first set of tokens for a match with the multiple term token.

8. The method of claim 1, wherein generating the first set of one or more tokens from the data-in-motion object comprises parsing the data-in-motion object to generate initial tokens and then encoding the initial tokens according to one or more encoding techniques applied to the dataset.

9. The method of claim 1 further comprising determining frequency of occurrence of tokens within the dataset and constructing the first set of minimal perfect hashing functions based, at least in part, on the frequency of occurrence of the tokens.

10. The method of claim 1 further comprising indicating violation of the data leakage prevention rule based on determining that the data field indexes complete the data field pattern for at least one of the records of the dataset.

11. A non-transitory, computer-readable medium having program code stored thereon that are executable by a computing device, the program code comprising instructions to:
for a set of tokens generated from a data-in-motion object, search a plurality of maps for the set of tokens,
wherein the plurality of maps map hash values of tokens occurring in a dataset to locations of the tokens within the dataset,
wherein a first and a second of the plurality of maps each corresponds to a different classes of token frequency within the dataset; and
based on the search of the plurality of maps for the set of tokens, determine whether token matches for a record of the dataset complete a data field pattern defined by a data leakage prevention rule for the dataset, wherein the instructions to determine whether token matches complete a data field pattern comprise instructions to prioritize token matches in the map corresponding to the least frequency class over token matches in the map corresponding to a greater frequency class; and
indicate violation of the data leakage prevention rule based on a determination that token matches for a record of the dataset complete the data field pattern.

12. The computer-readable medium of claim 11, wherein the program code further comprises instructions to invoke a security action based on indication of violation of the data leakage prevention rule.

13. The computer-readable medium of claim 11, wherein the program code to determine whether token matches for a record of the dataset complete the data field pattern defined by the data leakage prevention rule comprises program code to attempt to complete the data field pattern for records of the dataset with token matches based on searches of the first and the second map of the plurality of maps and subsequently attempt to complete the data field pattern with token matches based on searches of a third map of the plurality of maps for records indicated from the searches of the first and second maps, wherein the first map corresponds to unique tokens within the dataset, the second map corresponds to tokens within the dataset in an infrequent frequency class, and the third map corresponds to tokens within the dataset in a frequent frequency class, wherein the classification of token frequency as infrequent or frequent is based on a configurable frequency threshold.

14. The computer-readable medium of claim 11, wherein at least a first of the plurality of maps is constructed based on perfect hashing or minimal perfect hashing.

15. The computer-readable medium of claim 11, wherein the different token frequency classes comprise unique tokens, infrequent tokens, and frequent tokens, wherein a configurable threshold separates the class of infrequent tokens from the class of frequent tokens.

16. The computer-readable medium of claim 11, wherein each of the maps comprises a minimal perfect hashing function constructed from a key set of tokens corresponding to the one of the different token frequency classes and an ordered set of the tokens forming the key set that is ordered according to the positions determined from the minimal perfect hashing function.

17. An apparatus comprising:
a processor; and
a non-transitory computer-readable medium having instructions stored thereon that are executable by the processor to cause the apparatus to,
for a set of tokens generated from a data-in-motion object, search a plurality of maps for the set of tokens,
wherein the plurality of maps map hash values of tokens occurring in a dataset to locations of the tokens within the dataset,
wherein a first and a second of the plurality of maps each corresponds to different token frequency classes for the tokens within the dataset; and
based on the search of the plurality of maps for the set of tokens, determine whether token matches for a record of the dataset complete a data field pattern defined by a data leakage prevention rule for the dataset, wherein the instructions to determine whether token matches complete a data field pattern comprise instructions to prioritize token matches the map corresponding to the least token frequency class to the map corresponding to a greater token frequency class; and
indicate violation of the data leakage prevention rule based on a determination that token matches for a record of the dataset complete the data field pattern.

18. The apparatus of claim 17, wherein the instructions to determine whether token matches for a record of the dataset complete the data field pattern defined by the data leakage prevention rule comprise instructions executable by the processor to cause the apparatus to attempt to complete the data field pattern with token matches based on searches of a third map of the plurality of maps for records of the dataset with token matches based on searches of the first and the second map of the plurality of maps and subsequently attempt to complete the data field pattern for records indicated from the searches of the first and second maps yet to complete the data field pattern, wherein the first map corresponds to a unique tokens frequency class-within the dataset, the second map corresponds to an infrequent tokens frequency class, and the third map corresponds to a frequent tokens frequency class, wherein the classification of token frequency as infrequent or frequent is based on a configurable frequency threshold.

19. The apparatus of claim 17, wherein each of the maps comprises a minimal perfect hashing function constructed from a key set of tokens corresponding to the one of the different token frequency classes and an ordered set of the tokens forming the key set that is ordered according to the positions determined from the minimal perfect hashing function.

20. The apparatus of claim 18, wherein at least a first of the plurality of maps is constructed based on perfect hashing or minimal perfect hashing.

\* \* \* \* \*